(12) United States Patent
Kim

(10) Patent No.: US 12,528,327 B2
(45) Date of Patent: Jan. 20, 2026

(54) STABILIZER APPARATUS FOR VEHICLE

(71) Applicants: HYUNDAI MOTOR COMPANY, Seoul (KR); Kia Corporation, Seoul (KR)

(72) Inventor: JaeHun Kim, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/969,722

(22) Filed: Dec. 5, 2024

(65) Prior Publication Data

US 2025/0319735 A1 Oct. 16, 2025

(30) Foreign Application Priority Data

Apr. 16, 2024 (KR) .......................... 10-2024-0050536

(51) Int. Cl.
*B60G 21/055* (2006.01)

(52) U.S. Cl.
CPC .. *B60G 21/0553* (2013.01); *B60G 2202/1351* (2013.01); *B60G 2204/4404* (2013.01); *B60G 2206/427* (2013.01)

(58) Field of Classification Search
CPC ............... B60G 21/055; B60G 21/0553; B60G 21/0556; B60G 2202/13; B60G 2202/135; B60G 2202/1351; B60G 2202/136; B60G 2204/44; B60G 2204/4404; B60G 2204/45; B60G 2204/83; B60G 2206/427
USPC .................................................. 280/124.106
See application file for complete search history.

(56) References Cited

U.S. PATENT DOCUMENTS

| 12,344,058 | B1* | 7/2025 | Kim | ................... | B60G 21/0551 |
| 2020/0070617 | A1* | 3/2020 | Lim | ................... | B60G 21/0553 |
| 2024/0300278 | A1* | 9/2024 | Lee | ......................... | F16D 11/10 |
| 2024/0424850 | A1* | 12/2024 | Iino | ........................ | F16F 1/36 |

FOREIGN PATENT DOCUMENTS

| DE | 102007007417 A1 * | 8/2008 | ........... B60G 21/055 |
| JP | S6282433 U * | 5/1987 | |
| KR | 10-2024-0066811 A | 5/2024 | |
| KR | 20250067317 A * | 5/2025 | ......... B60G 21/0558 |
| WO | WO-2006034698 A1 * | 4/2006 | ......... B60G 21/0556 |

OTHER PUBLICATIONS

Description translation for KR 20240066811 from Espacenet (Year: 2024).*
Description Translation for KR 20250067317A from Espacenet (Year: 2025).*

* cited by examiner

Primary Examiner — Jason D Shanske
Assistant Examiner — Daniel M. Keck
(74) Attorney, Agent, or Firm — Fish & Richardson P.C.

(57) ABSTRACT

A stabilizer apparatus for a vehicle includes a first stabilizer bar connected to a first side suspension arm of the vehicle, a second stabilizer bar connected to a second side suspension arm of the vehicle, an inner case connected to the first stabilizer bar, an outer case that accommodates the inner case therein and is connected to the second stabilizer bar, and rotatably connected to the inner case, a torsion bar having a first end connected to the inner case and a second end connected to the outer case, stoppers arranged at predetermined intervals in the inner case, and a stopping member disposed at the outer case and placed between the stoppers.

19 Claims, 19 Drawing Sheets

STABILIZER APPARATUS FOR VEHICLE

CROSS-REFERENCE TO RELATED APPLICATION

This application claims priority to and the benefit of Korean Patent Application No. 10-2024-0050536, filed in the Korean Intellectual Property Office, on Apr. 16, 2024, the entire contents of which are incorporated herein by reference.

TECHNICAL FIELD

The present disclosure relates to a suspension system for a vehicle. More particularly, the present disclosure relates to a stabilizer apparatus of a suspension system.

BACKGROUND

A vehicle may include a suspension system that is installed between the vehicle body and the wheels and absorbs vibrations of the vehicle body when the vehicle is driven.

For instance, the suspension system may include a solid shaft type stabilizer bar that suppresses rolling while the vehicle is driving. The middle two sides of the stabilizer bar are fixed to the vehicle body through mounting bushes, and the two ends of the stabilizer bar are fixed to the suspension arm through links.

In some cases, the stabilizer bars may not work when the left and right wheels move up and down simultaneously, but they twist and suppress the roll motion of the vehicle body with torsional elastic force when the left and right wheels move up and down relative to each other.

In some cases, when the vehicle body tilts to the outside of the turn due to centrifugal force while the vehicle is turning, or when the left and right wheels have a relative phase difference due to a bump or rebound during driving, the stabilizer bar may twist and stabilize the posture of the vehicle body by the torsional elastic force.

In some cases, where the stabilizer bar has a constant strength value, its own torsional elastic force alone may be insufficient to ensure turning stability under various conditions.

In some cases, ARC (Active Roll Control) or ARS (Active Roll Stabilization) may actively control the vehicle's roll behavior by changing the strength value of the stabilizer bar according to the vehicle's driving conditions.

In some cases, where an active roll control apparatus uses a plurality of parts such as a sensor, an actuator, a damping coupler, and a sliding unit to vary the roll strength, the manufacturing cost may increase.

SUMMARY

The present disclosure describes a vehicle stabilizer apparatus capable of controlling the roll behavior of a vehicle by simply changing the roll strength according to the driving condition of the vehicle and adjusting the inflection point of the roll strength according to the driving tendency of the driver.

According to one aspect of the subject matter described in this application, a stabilizer apparatus for a vehicle includes a first stabilizer bar connected to a first side suspension arm of the vehicle, a second stabilizer bar connected to a second side suspension arm of the vehicle, an inner case connected to the first stabilizer bar, an outer case that accommodates the inner case therein and is connected to the second stabilizer bar, the outer case being rotatably connected to the inner case, a torsion bar having (i) a first end connected to the inner case and (ii) a second end connected to the outer case, a plurality of stoppers disposed at the inner case and arranged at a predetermined interval, and a stopping member disposed at the outer case, the stopping member being disposed between the plurality of stoppers.

Implementations according to this aspect can include one or more of the following features. For example, the stopping member can be disposed at an inside of the outer case and disposed at a predetermined distance from the plurality of stoppers. In some examples, the stopping member can be configured to be in contact with one of the plurality of stoppers based on twist directions of the first stabilizer bar and the second stabilizer bar.

In some implementations, the inner case can include a body having a cylinder shape, the body having a circular arc groove that is defined at a portion of an exterior circumference surface of the body along a circumferential direction of the body. In some examples, the plurality of stoppers may include a stepped portion defined at each side of the circular arc groove. In some examples, the stopping member can be disposed in an inner region of the circular arc groove and spaced apart from the stepped portion by a predetermined distance.

In some implementations, the inner case can have (i) an inner closed end disposed at a first side of the inner case and (ii) an inner open end disposed at a second side of the inner case. The outer case can have (i) an outer open end disposed at a first side of the outer case, (ii) an outer closed end disposed at a second side of the outer case, and (iii) a cover connected to the outer open end. In some examples, the inner case can include (i) a first protruding portion disposed at the inner closed end and (ii) a second protruding portion formed at the inner open end, where the outer case can include a third protruding portion disposed at the outer closed end.

In some examples, the first stabilizer bar can pass through the cover and be connected to the first protruding portion, where the second stabilizer bar can be connected to the third protruding portion.

In some implementations, the stabilizer apparatus can further include a first bearing that connects the cover of the outer case to the first protruding portion, and a second bearing that connects the outer closed end of the outer case to the second protruding portion.

In some implementations, the torsion bar can be connected to the inner closed end and disposed at an inside of the inner case, where the torsion bar is connected to the outer closed end through the inner open end.

In some examples, the torsion bar can include (i) a first connecting protrusion disposed at the first end of the torsion bar and (ii) a second connecting protrusion disposed at the second end of the torsion bar, each of the first and second connecting protrusions having a polygonal shape. The inner case can define a first connecting pit at an inner surface of the inner closed end, the first connecting pit receiving the first connecting protrusion, and the outer case can define a second connecting pit at an inner surface of the outer closed end, the second connecting pit receiving the second connecting protrusion.

In some implementations, the stopping member can be movably disposed at the outer case and configured to adjust a gap between the stopping member and one of the plurality of stoppers. In some examples, the stopping member can include a cam bolt movably mounted to the outer closed end and the cover, and a fastening nut that engages with the cam bolt and fixes the cam bolt to the outer closed end and the cover. In some examples, the outer case can define a guide slot that extends through the outer closed end and the cover, where the cam bolt can include a bolt head, a bolt rod connected to the bolt head and fitted into the guide slot, and a cam flange eccentrically connected to a side of the bolt rod.

In some implementations, the fastening nut engages with a free end of the bolt rod and supports the outer closed end and the cover through the cam flange. In some examples, the outer case can further define a cam follower groove at an outer surface of the outer closed end and an outer surface of the cover, where the cam flange is rotatably connected to the cam follower groove.

In some examples, the cam flange has a graduation. The graduation of the cam flange can be configured to align the cam bolt with a position of the outer case.

In some implementations, the stopping member can include first and second cam bolts that are movably mounted to the outer closed end and the cover, and first and second fastening nuts that engage with the first and second cam bolts, respectively, and fix the first and second cam bolts to the outer closed end and the cover.

In some implementations, the roll behavior of the vehicle can be controlled by changing the roll strength value with a simple configuration according to the driving condition of the vehicle, so that the manufacturing cost such as material cost can be reduced.

In addition, in some implementations, since the inflection point of the roll strength can be adjusted with a simple configuration, the roll behavior of the vehicle can be controlled according to the driving tendency of the driver.

The effects that can be obtained or expected from implementations of the present disclosure are directly or implicitly disclosed in the detailed description of the implementations of the present disclosure. That is, various effects predicted according to implementations of the present disclosure will be disclosed in the detailed description to be provided later.

BRIEF DESCRIPTION OF THE DRAWINGS

Since these drawings are for reference in explaining exemplary implementations of the present disclosure, the technical ideas of the present disclosure should not be interpreted as limited to the attached drawings.

DETAILED DESCRIPTION

The present disclosure will be described more fully hereinafter with reference to the accompanying drawings, in which implementations of the disclosure are shown. As those skilled in the art would realize, the described implementations can be modified in various different ways, all without departing from the spirit or scope of the present disclosure.

The terminology used herein is for the purpose of describing particular implementations only and is not intended to limit the present disclosure. As used herein, the singular forms are intended to include the plural forms as well, unless the context clearly indicates otherwise.

The term "connected" in this specification indicates a physical relationship between two components in which the components are directly connected to each other by welding, rivets, self-piercing rivets (SPR), flow drill screws (FDS), structural adhesives, etc., or indirectly connected through one or more intermediate components.

As used herein, the terms 'vehicle', 'vehicular', 'automobile' or other similar terms used herein generally include passenger automobiles, including passenger cars, sport utility vehicles (SUVs), buses, trucks, various commercial vehicles, and also include hybrid automobiles, electric automobiles, hybrid-electric automobiles, electric-based Purpose Built Vehicles (PBVs), hydrogen-powered vehicles and other alternative fuel vehicles (e.g., fuels derived from resources other than petroleum).

Hereinafter, implementations of the present disclosure will be described in detail with reference to the accompanying drawing.

Figure 1:
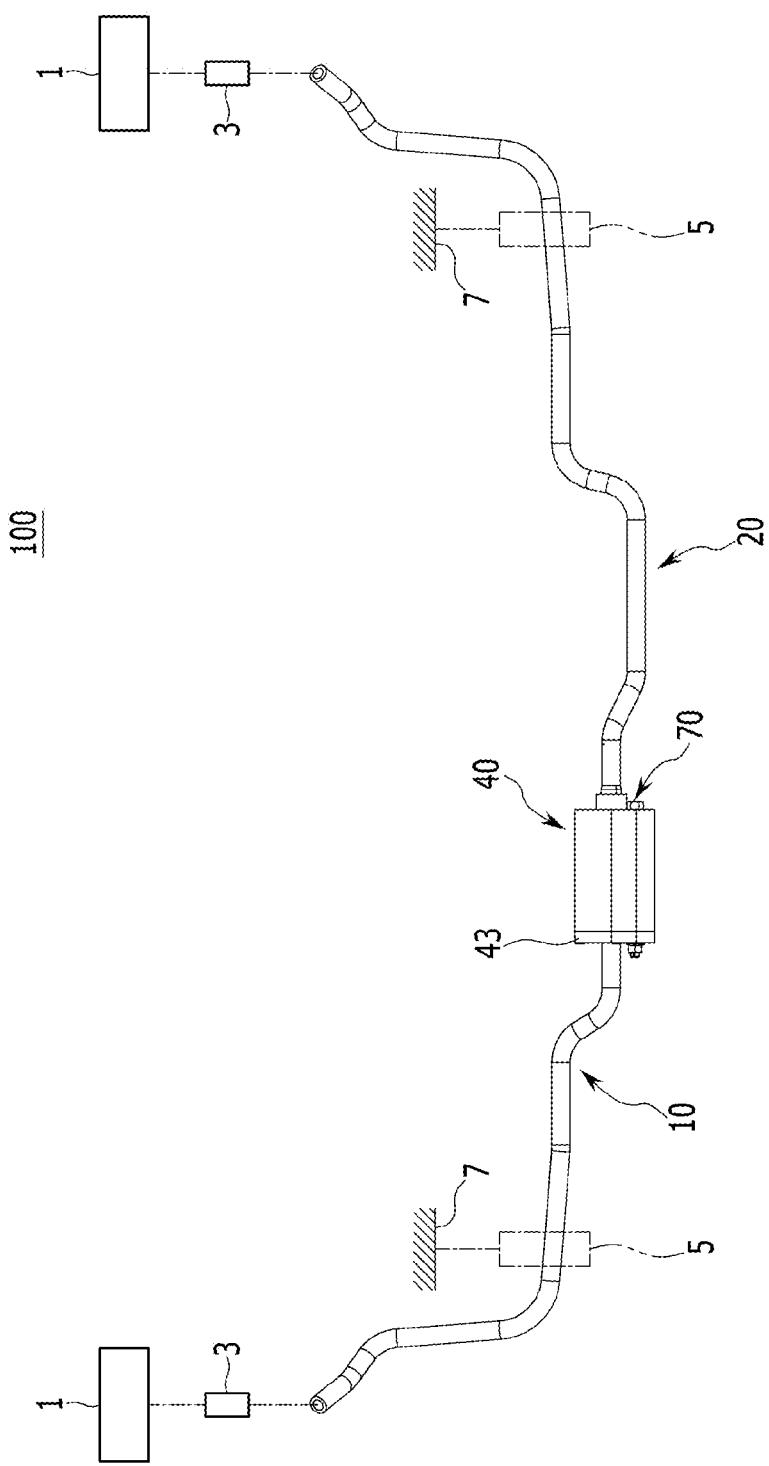
FIG. 1 is a top plan view illustrating an example of a stabilizer apparatus for a vehicle.

FIG. 1 is a top plan view illustrating an example of a stabilizer apparatus for a vehicle.

Referring to FIG. 1, a vehicle stabilizer apparatus 100 can be applied to a suspension system of a vehicle.

In some implementations, the vehicle stabilizer apparatus 100 can be applied to a front wheel suspension system and/or a rear wheel suspension system of a vehicle. For example, the vehicle stabilizer apparatus 100 is connected to one side of the suspension system and the other side of the suspension arm 1 through a link 3 (a person of an ordinary skill in the art usually calls it a 'step bar link'). The suspension arm 1 can include, for example, lower arms respectively arranged on one side and the other side of a multi-link type suspension system.

In some examples, the vehicle stabilizer apparatus 100 is fixed to a vehicle body 7, for example, a subframe, through one side and the other side mounting bush 5 along the vehicle width direction.

In this specification, the reference direction for explaining the components below can be set as the front-rear direction of the body (e.g., body length direction), the width direction (e.g., left-right direction), and the up-down direction (e.g., height direction) based on the body.

The vehicle stabilizer apparatus 100 provides a structure capable of controlling the roll behavior of a vehicle by changing the roll strength with a simple configuration according to the driving condition of the vehicle.

Figure 2A:
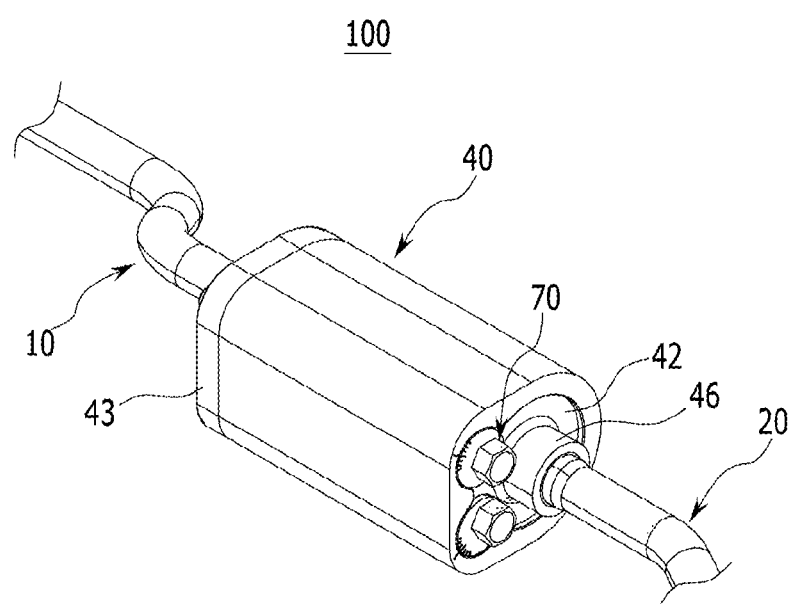
FIG. 2A and FIG. 2B are perspective views illustrating the stabilizer apparatus.
Figure 2B:
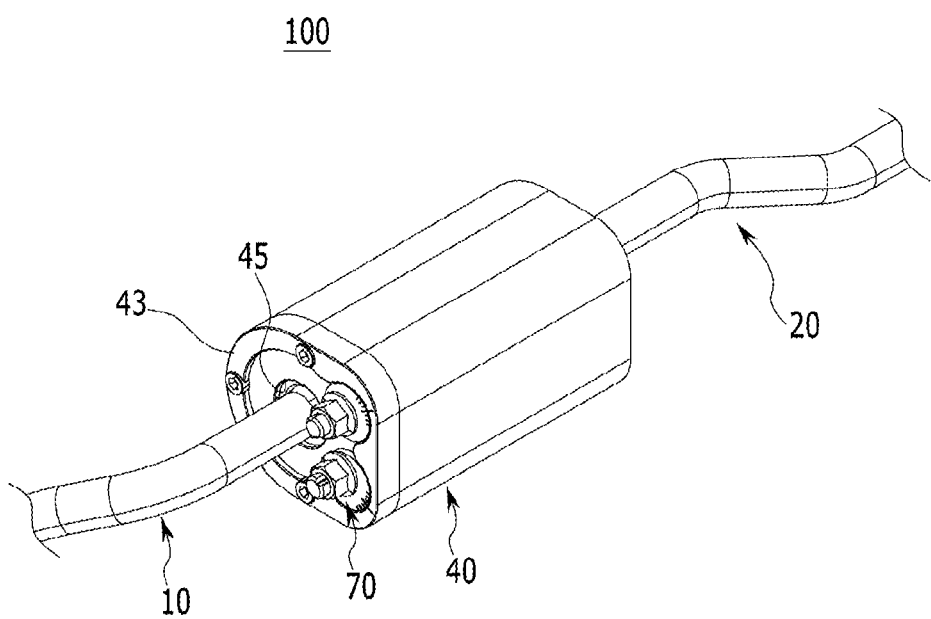
Figure 3:
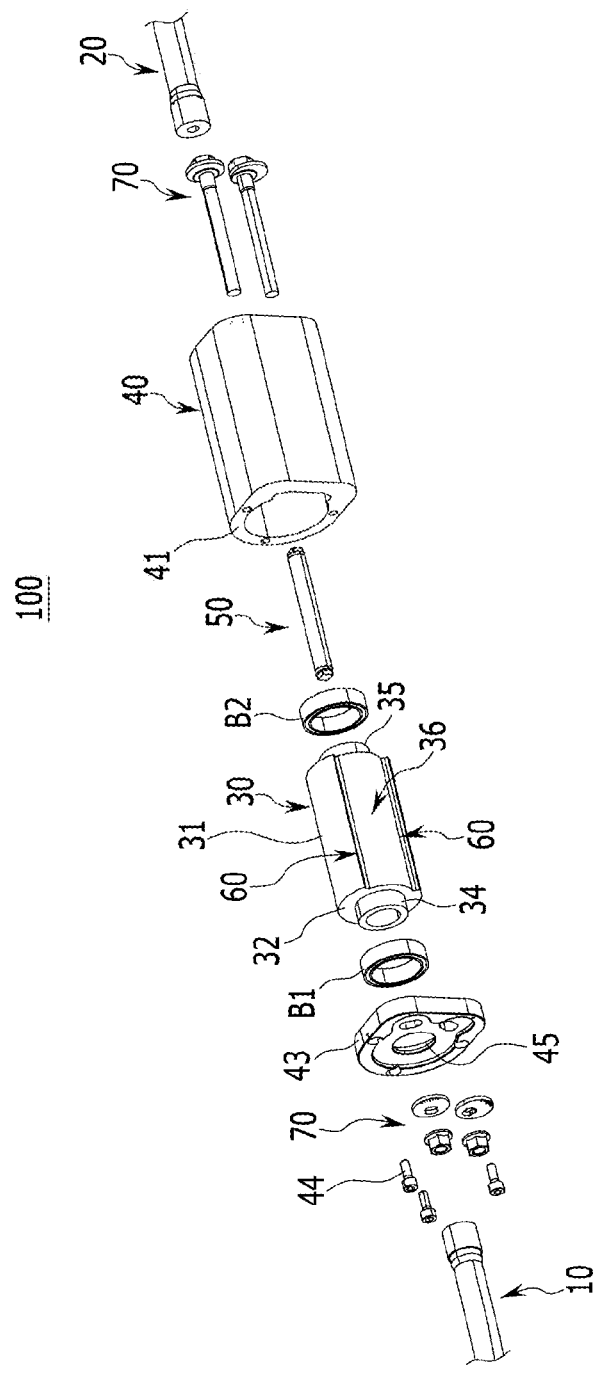
FIG. 3 and FIG. 4 are exploded perspective views illustrating the stabilizer apparatus.
Figure 4:
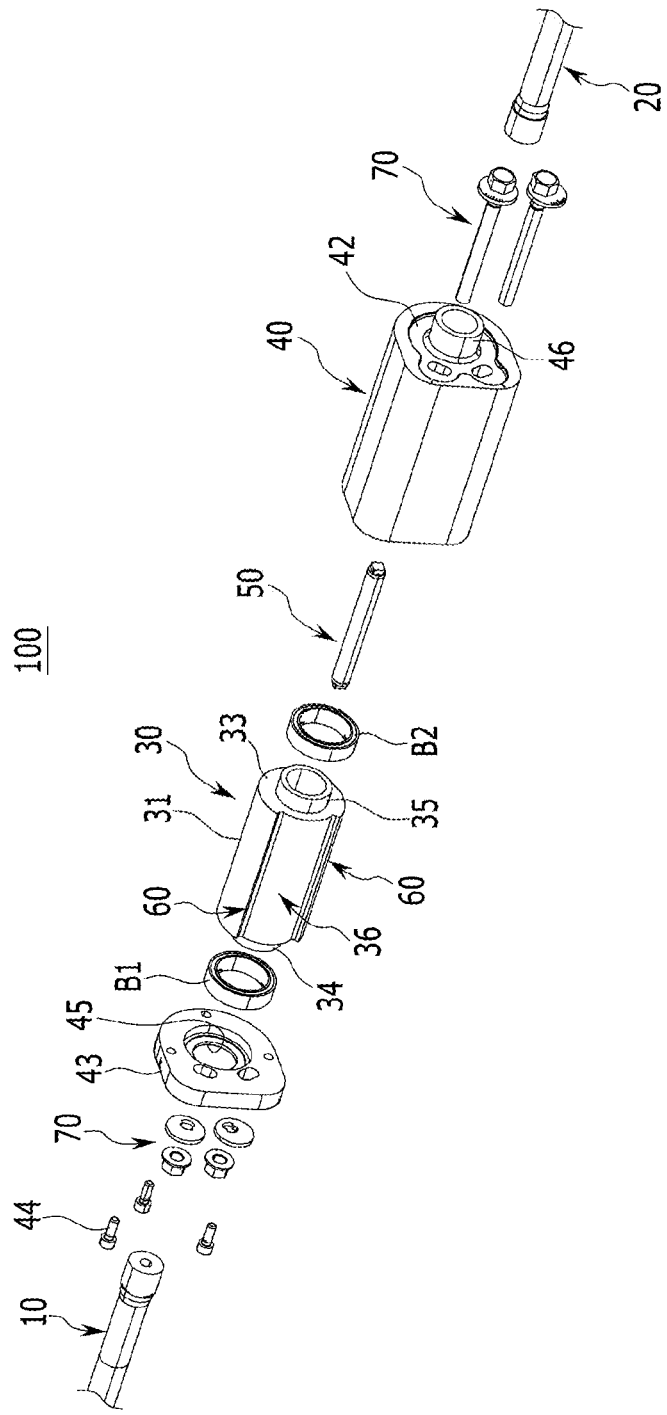
Figure 5:
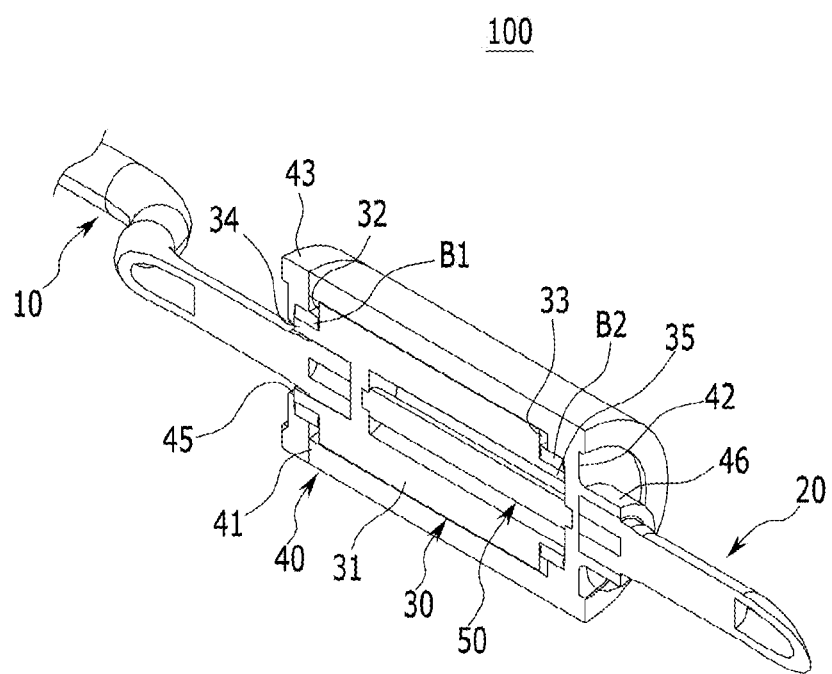
FIG. 5 is a cross-sectional view illustrating the vehicle stabilizer apparatus.

FIG. 2A and FIG. 2B are perspective views illustrating the stabilizer apparatus. FIG. 3 and FIG. 4 are exploded perspective views illustrating the stabilizer apparatus, and FIG. 5 is a cross-sectional view illustrating the vehicle stabilizer apparatus.

In some implementations, referring to FIG. 1 to FIG. 5, the vehicle stabilizer apparatus 100 includes a first stabilizer bar 10, a second stabilizer bar 20, an inner case 30, an outer case 40, a torsion bar 50, a pair of stoppers 60, and a pair of stopping members 70.

In some implementations, the first stabilizer bar 10 can be provided as a bar that can be torsionally deformed depending on the driving condition of the vehicle.

The first stabilizer bar 10 can be connected to one side of the suspension arm 1 of the suspension system via link 3 mentioned above. In some examples, the first stabilizer bar 10 can be fixed to the vehicle body 7 through the one-sided mounting bush 5 mentioned above.

In some implementations, the second stabilizer bar 20 can be provided as a torsional deformable bar depending on the driving condition of the vehicle.

The second stabilizer bar 20 can be connected to the other side suspension arm 1 of the suspension system via link 3 mentioned above. Additionally, the second stabilizer bar 20 can be fixed to the vehicle body 7 via the other one-sided mounting bush 5 mentioned above.

Referring to FIG. 3 to FIG. 5, in some implementations, the inner case 30 is connected to the first stabilizer bar 10.

Figure 6A:
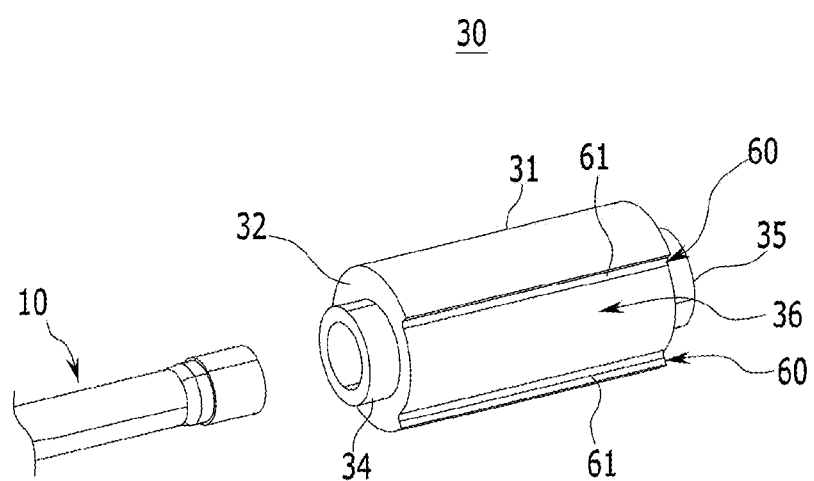
FIG. 6A and FIG. 6B are perspective views illustrating an example of an inner case applied to the vehicle stabilizer apparatus.
Figure 6B:
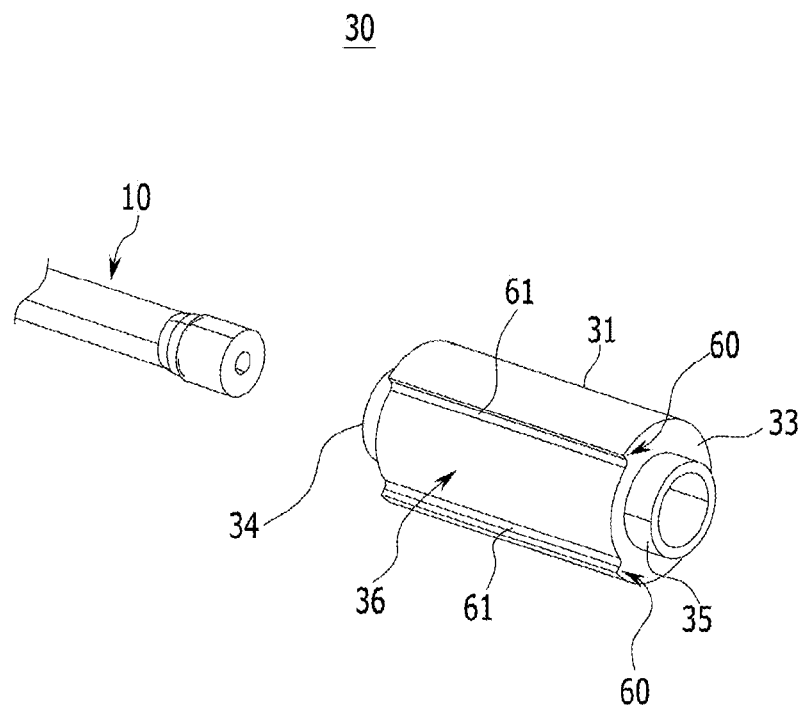
Figure 7:
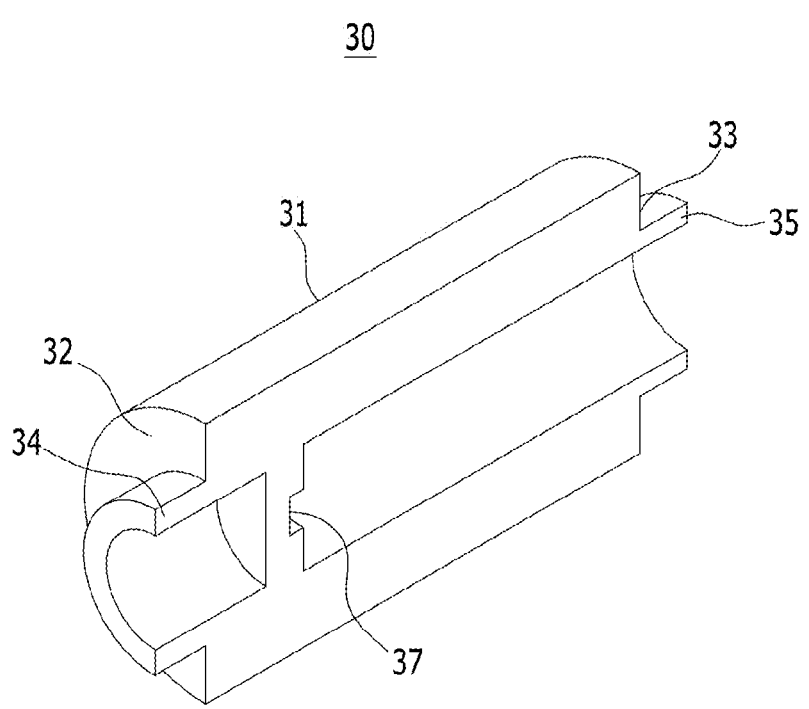
FIG. 7 is a cross-sectional view illustrating an example of an inner case applied to the vehicle stabilizer apparatus.

FIG. 6A and FIG. 6B are perspective views illustrating an inner case applied to a vehicle stabilizer apparatus, and FIG. 7 is a cross-sectional view illustrating an inner case applied to a vehicle stabilizer apparatus.

Referring to FIG. 3 to FIG. 7, an implementation of the inner case 30 includes a body 31 and a circular arc groove 36.

The body 31 is provided in an example as a cylinder shape with one end closed and the other end open.

The inner case 30 includes an inner closed end 32 formed on one side of the body 31 and an inner open end 33 formed on the other side of the body 31.

The inner case 30 further includes a first protruding portion 34 and a second protruding portion 35.

The first protruding portion 34 is formed in a boss shape at the inner closed end 32. In some examples, the second protruding portion 35 is formed in a boss shape at the inner open end 33.

The first stabilizer bar 10 as described above is connected to the first protruding portion 34. In one example, the first stabilizer bar 10 is fitted into the first protruding portion 34 and can be connected to the first protruding portion 34 by welding.

The circular arc groove 36 is formed along a circumferential direction on a portion of the exterior circumference surface of the body 31 for a predetermined section. That is, the circular arc groove 36 can be formed as a groove region between two predetermined positions on the circumference of the body 31.

In some implementations, referring to FIG. 1 to FIG. 5, the outer case 40 is connected to the second stabilizer bar 20 with the inner case 30 placed inside, and is rotatably connected relative to the inner case 30.

Figure 8A:
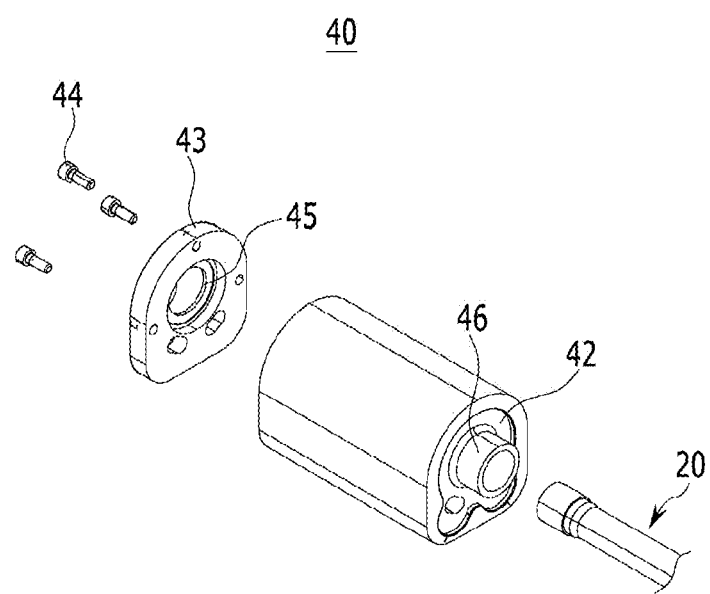
FIG. 8A and FIG. 8B are exploded perspective views illustrating an example of an outer case applied to the vehicle stabilizer apparatus.
Figure 8B:
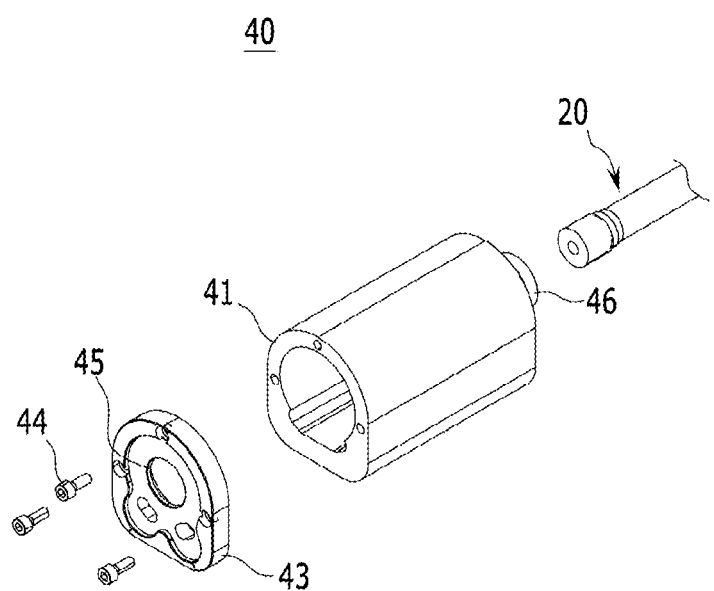
Figure 9:
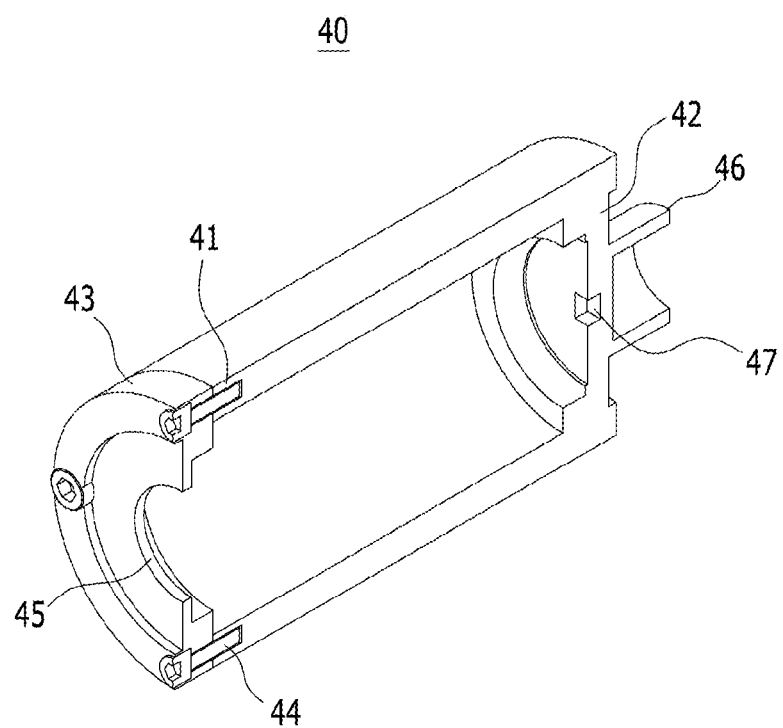
FIG. 9 is a cross-sectional view illustrating the outer case.

FIG. 8A and FIG. 8B are exploded perspective views illustrating an example of an outer case applied to a vehicle stabilizer apparatus, and FIG. 9 is a cross-sectional view illustrating the outer case.

Referring to FIG. 1 to FIG. 9, the outer case 40 is provided as a housing type in which one end is open and the other end is closed. The outer case 40 includes an outer open end 41, an outer closed end 42, and a cover 43. For example, the outer open end 41 is formed at one end of the outer case 40. The outer closed end 42 is formed at the other end of the outer case 40. In some examples, the cover 43 is connected to the outer open end 41.

The cover 43 is engaged to the outer open end 41 by a plurality of engaging bolts 44. The cover 43 includes a connection hole 45 that is connected to the internal space of the outer case 40.

As shown in FIG. 3 to FIG. 6B, the first stabilizer bar 10 as described above can be connected to the first protruding portion 34 of the inner case 30 by passing through the connection hole 45 of the cover 43.

The outer case 40 further includes a third protruding portion 46 formed at the outer closed end 42. The third protruding portion 46 is formed in a boss shape at the outer closed end 42.

The second stabilizer bar 20 is connected to the third protruding portion 46. In one example, the second stabilizer bar 20 is fitted into the third protruding portion 46 and can be connected to the third protruding portion 46 by welding.

The inner case 30 and the outer case 40 can be rotatably connected relative to each other via a first bearing B1 and a second bearing B2.

The cover 43 of the outer case 40 is connected to the first protruding portion 34 of the inner case 30 via the first bearing B1. In some examples, the outer closed end 42 of the outer case 40 is connected to the second protruding portion 35 of the inner case 30 through the second bearing B2.

Accordingly, the inner case 30 and the outer case 40, which are connected to each other through the first bearing B1 and the second bearing B2, can be relatively rotated in opposite directions by the first stabilizer bar 10 and the second stabilizer bar 20, which twist in opposite directions.

Referring to FIG. 3 to FIG. 5, in some implementations, the torsion bar 50 is configured to generate roll strength (e.g., torsional torque) by rotation of the inner case 30 and the outer case 40 during torsion of the first stabilizer bar 10 and the second stabilizer bar 20.

The torsion bar 50 is connected to the inner case 30 and the outer case 40 between the first stabilizer bar 10 and the second stabilizer bar 20. One end of the torsion bar 50 can be connected to the inner case 30, and the other end of the torsion bar 50 can be connected to the outer case 40.

The torsion bar 50 can be connected to the inner closed end 32 inside the inner case 30 as shown in FIG. 7.

In some examples, the torsion bar 50 is connected to the outer closed end 42 of the outer case 40 as shown in FIG. 9 through the inner open end 33 of the inner case 30 as shown in FIG. 7.

Figure 10:
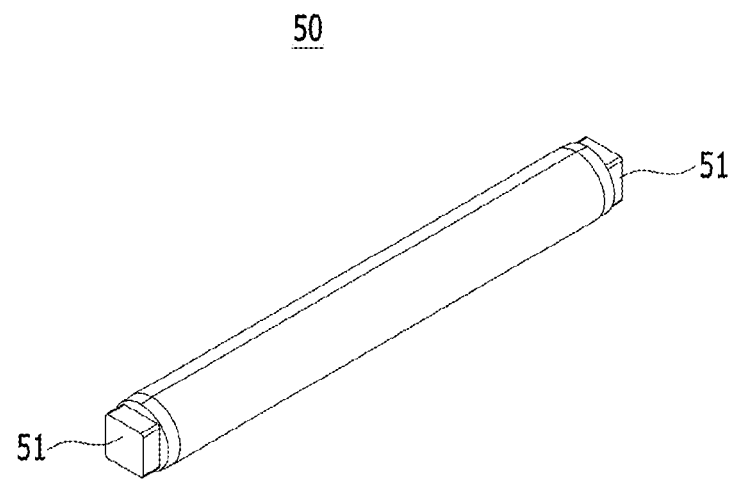
FIG. 10 is a perspective view illustrating an example of a torsion bar applied to the vehicle stabilizer apparatus.

FIG. 10 is a perspective view illustrating a torsion bar applied to a vehicle stabilizer apparatus.

In some examples, the torsion bar 50, as shown in FIG. 10, includes connecting protrusions 51 having polygonal shapes (e.g., square cross-section shapes) and disposed at ends of the torsion bar 50, respectively.

The connecting protrusion 51 of a first end of the torsion bar 50 can be connected to a first connecting pit 37 formed on the inner surface of the inner closed end 32 of the inner case 30 as shown in FIG. 7. In some examples, the connecting protrusion 51 of a second end of the torsion bar 50 can be connected to a second connecting pit 47 formed on the inner surface of the outer closed end 42 of the outer case 40 as illustrated in FIG. 9. The first connecting pit 37 and the second connecting pit 47 can be formed in a polygonal shape corresponding to the shape of the connecting protrusion 51.

Referring to FIG. 3 and FIG. 4, in some implementations, the stoppers 60 are formed in the inner case 30 at predetermined intervals along the twist direction of the first stabilizer bar 10 and the second stabilizer bar 20.

The stoppers 60 are formed on the exterior circumference surface of the inner case 30, as shown in FIG. 6A and FIG. 6B. The stoppers 60 include stepped portions (or stop parts) 61 formed on each side of the circular arc groove 36. That is, the stepped portion 61 is formed on the exterior circumference surface of the inner case 30 arranged on the inner side of the outer case 40. Referring to FIG. 2 to FIG. 4, in some implementations, the stopping member 70 is configured to vary the roll strength depending on the driving condition of the vehicle.

The stopping member 70 is configured to generate roll strength through additional torsion of the first stabilizer bar 10 and second stabilizer bar 20 depending on the driving conditions of the vehicle.

In some examples, the roll strength due to the additional torsion of the first stabilizer bar 10 and the second stabilizer bar 20 can be defined as a strength greater than the roll strength of the torsion bar 50 due to the torsion of the first stabilizer bar 10 and the second stabilizer bar 20.

That is, the roll strength of torsion bar 50 due to the torsion of the first stabilizer bar 10 and the second stabilizer bar 20 and the roll strength due to the additional torsion of the first stabilizer bar 10 and the second stabilizer bar 20 can be defined as a double strength.

The stopping member 70 is configured to adjust (or tune) the inflection point of the dual roll strength according to the driving conditions of the vehicle.

The stopping member 70 is installed in outer case 40 and is placed between the stoppers 60 mentioned above. That is, the stopping member 70 is placed at a predetermined interval from the stoppers 60 on the inner side of the outer case 40.

In some examples, the stopping member 70 can come into contact with either one of the stoppers 60 depending on the twist direction of the first stabilizer bar 10 and the second stabilizer bar 20.

Figure 11A:
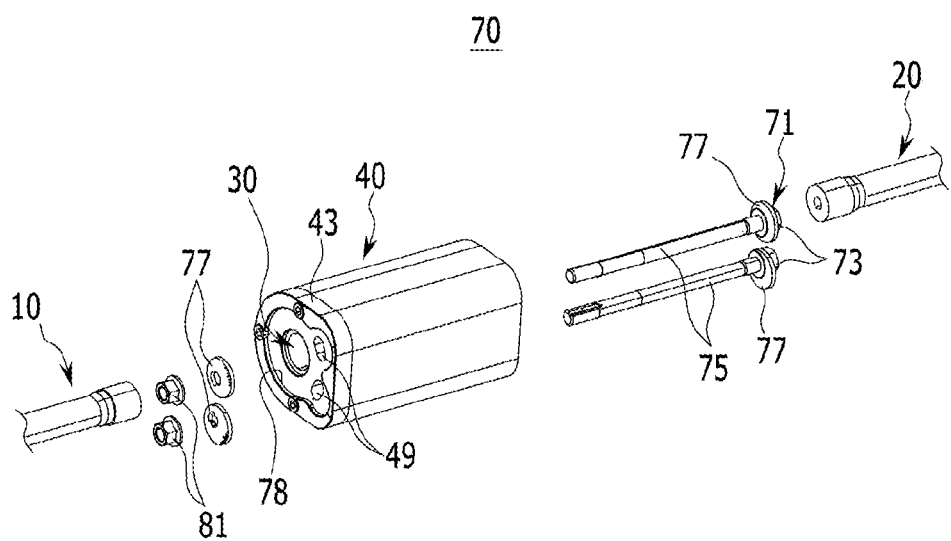
FIG. 11A and FIG. 11B are exploded perspective views illustrating an example of a stopping member applied to the stabilizer apparatus.
Figure 11B:
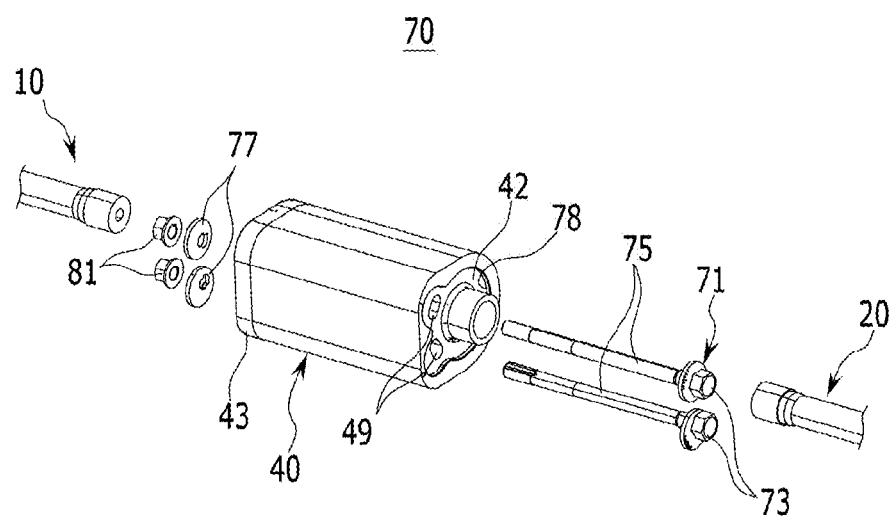
Figure 12A:
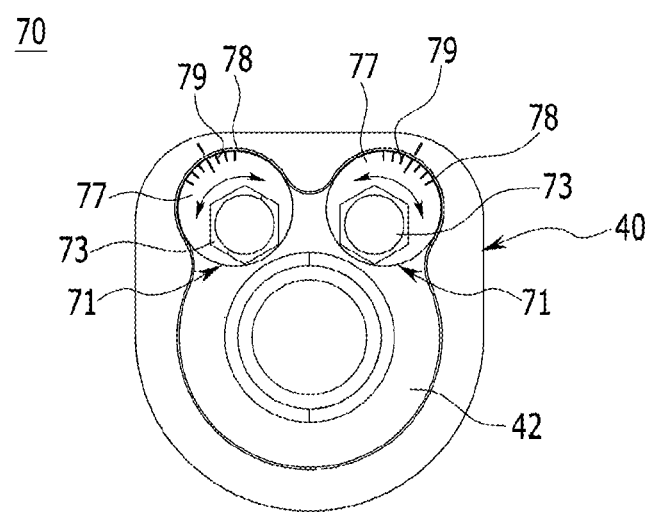
FIG. 12A and FIG. 12B are side views illustrating the stopping member.
Figure 12B:
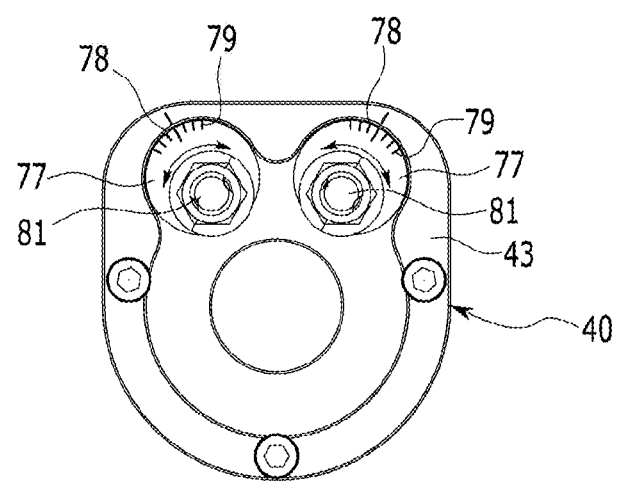
Figure 13:
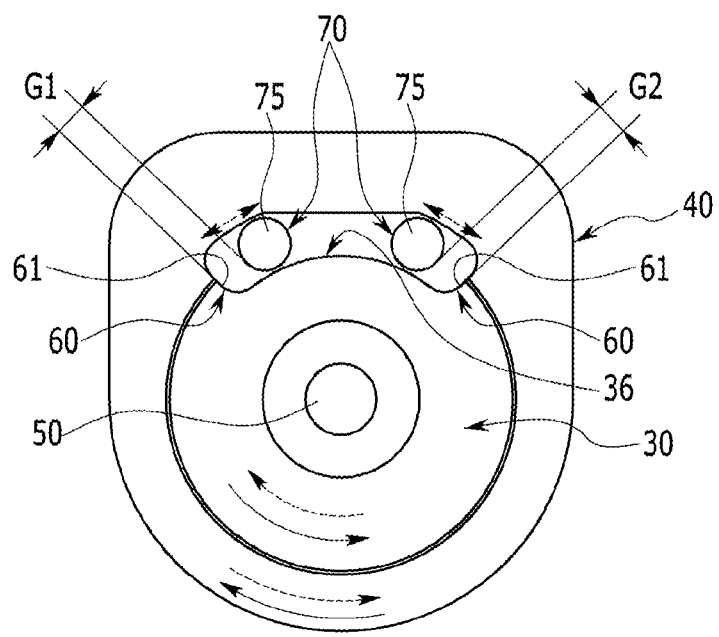
FIG. 13 is a cross-sectional view illustrating an example of a joint structure of the stopping member.

FIG. 11A and FIG. 11B are exploded perspective views illustrating an example of a stopping member applied to a stabilizer apparatus for a vehicle, FIG. 12A and FIG. 12B are side views illustrating a stopping member applied to a stabilizer apparatus for a vehicle, and FIG. 13 is a cross-sectional view illustrating a joint structure of a stopping member applied to a vehicle stabilizer apparatus.

Referring to FIG. 11A to FIG. 13, the stopping member 70 is positioned at a predetermined interval from the stepped portion 61 of the stoppers 60 in the inner region of the circular arc groove 36 of the inner case 30.

The stopping member 70 can be movably installed in the outer case 40 along the twist direction of the first stabilizer bar 10 and the second stabilizer bar 20 to adjust the gaps G1, and G2 with the stoppers 60.

The stopping member 70 includes a cam bolt 71 and a fastening nut 81.

The drawing shows that there are two cam bolts 71 and two fastening nuts 81, but this is not limited to this.

The cam bolt 71 is mounted movably along the twist direction of the first stabilizer bar 10 and the second stabilizer bar 20 on the outer closed end 42 of the outer case 40 and the cover 43.

The cam bolt 71 includes a bolt head 73, a bolt rod 75, and a cam flange 77.

The bolt head 73 is placed at a position corresponding to the outer closed end 42 of the outer case 40.

The bolt rod 75 is connected to the bolt head 73. The bolt rod 75 is inserted into the guide slot 49 formed along the twist direction of the first stabilizer bar 10 and the second stabilizer bar 20 in the outer closed end 42 and the cover 43, respectively.

The bolt rod 75 is positioned in the inner region of the circular arc groove 36 of the inner case 30, apart from the stepped portions 61 of the stoppers 60 with a predetermined gap G1, and G2.

The cam flange 77 is eccentrically connected to each side of the bolt rod 75. That is, the axis centers of the bolt head 73 and bolt rod 75 are positioned off the center of the cam flange 77. In one example, the cam flange 77 can be provided as a flat cam type.

The cam flange 77 is fitted in a pair along the axial direction to the bolt rod 75. The cam flange 77 is connected to the bolt rod 75 so as to rotate together with the bolt rod 75. The cam flange 77 is configured to support the outer surface of the outer closed end 42 through the bolt head 73 and the outer surface of the cover 43.

These cam flanges 77 are rotatably connected to cam follower grooves 78 formed on the outer surface of the outer closed end 42 and the outer surface of the cover 43, respectively.

When the above cam flange 77 eccentrically connected with the cam flange 77 is rotated within the cam follower groove 78, the bolt rod 75 can move along the guide slot 49. Therefore, the gaps G1 and G2 between the bolt rod 75 and the stoppers 60 can be adjusted.

The cam flange 77 has a graduation 79 (e.g., a drawing scale) formed thereto. The graduation 79 can be configured to align with a position (e.g., a marking or line) defined at the outer case 40 (see FIG. 12.B).

Additionally, the fastening nut 81 is configured to secure the cam bolt 71 to the outer closed end 42 of the outer case 40 and the cover 43. The fastening nut 81 engages the cam bolt 71.

The fastening nut 81 engages the free end of the bolt rod 75 to support the outer closed end 42 and cover 43 via the cam flange 77. The free end can be defined as the opposite direction end of the bolt head 73.

Hereinafter, the assembling process of a vehicle stabilizer apparatus 100 configured as described above will be described in detail, referring to FIG. 1 to FIG. 13.

In some implementations, the inner case 30 is provided and the torsion bar 50 is disposed inside the inner case 30. The connecting protrusion 51 on one side of the torsion bar 50 is connected to the first connecting pit 37 formed on the inner surface of the inner closed end 32 of the inner case 30.

In some implementations, the outer case 40 is provided and the inner case 30 is placed inside the outer case 40.

The inner case 30 is placed inside the outer case 40 through the outer open end 41 of the outer case 40. The other connecting protrusion 51 of the torsion bar 50 is connected to the second connecting pit 47 formed on the inner surface of the outer closed end 42 of the outer case 40. The cover 43 of the outer case 40 is engaged to the outer open end 41 by the engaging bolts 44.

The cover 43 is connected to the first protruding portion 34 of the inner case 30 via the first bearing B1. The outer closed end 42 of the outer case 40 is connected to the second protruding portion 35 of the inner case 30 via the second bearing B2.

The first stabilizer bar 10 passes through the connection hole 45 of the cover 43 and is connected to the first protruding portion 34 of the inner case 30. The second stabilizer bar 20 is connected to the third protruding portion 46 of the outer case 40.

In some implementations, the cam bolt 71 and the fastening nut 81 of the stopping members 70 are provided. The cam bolt 71 includes the bolt head 73, the bolt rod 75, and the cam flange 77.

In this condition, one cam flange 77 is fitted to the bolt rod 75.

These bolt rods 75 are fitted into guide slots 49 formed in the outer closed end 42 of the outer case 40 and the cover 43, respectively. The bolt rod 75 is positioned between the stepped portion 61 of the stoppers 60 in the inner region of the circular arc groove 36 of the inner case 30.

Another cam flange 77 is connected to the free end of the bolt rod 75 passing through the guide slot 49. The cam flange 77 as described above is rotatably connected to the cam follower groove 78 formed on the outer surface of the outer closed end 42 and the outer surface of the cover 43, respectively.

The cam flange 77 can rotate relatively with the bolt rod 75 within the cam follower groove 78. The amount of rotation (or rotation angle) of the cam flange 77 can be checked by the graduation 79.

Since the bolt rod 75 is eccentrically connected to the cam flange 77, the bolt rod 75 can move along the guide slot 49. The gaps G1 and G2 between the bolt rod 75 and the stepped portion 61 of the stoppers 60 can be adjusted depending on the amount of rotation of the cam flange 77.

In this way, with gaps G1 and G2 between the bolt rod 75 and the stepped portion 61 being predetermined, the fastening nut 81 engages the free end of the bolt rod 75. Then, the cam bolt 71 is fixed to the outer closed end 42 of the outer case 40 and the cover 43.

Hereinafter, the operation of a vehicle stabilizer apparatus 100 assembled as described above will be described in detail.

When the vehicle is driving straight and the wheel moves up and down (e.g., bump or rebound), the first stabilizer bar 10 and the second stabilizer bar 20 twist in opposite directions.

Accordingly, the inner case 30 connected to the first stabilizer bar 10 and the outer case 40 connected to the second stabilizer bar 20 rotate relative to each other, for example, in opposite directions, via the first bearing B1 and the second bearing B2 (see FIG. 5).

Then, the torsion bar 50 is twisted by the rotation of the inner case 30 and the outer case 40, and the roll motion of the vehicle body can be suppressed by the torsion spring force generated at this time.

In this case, the bolt rod 75 of the cam bolt 71 does not contact the stepped portion 61 of the stoppers 60 in the inner region of the circular arc groove 36 of the inner case 30, but is positioned in the predetermined gap G1 and G2 regions with the stepped portion 61.

Figure 14:
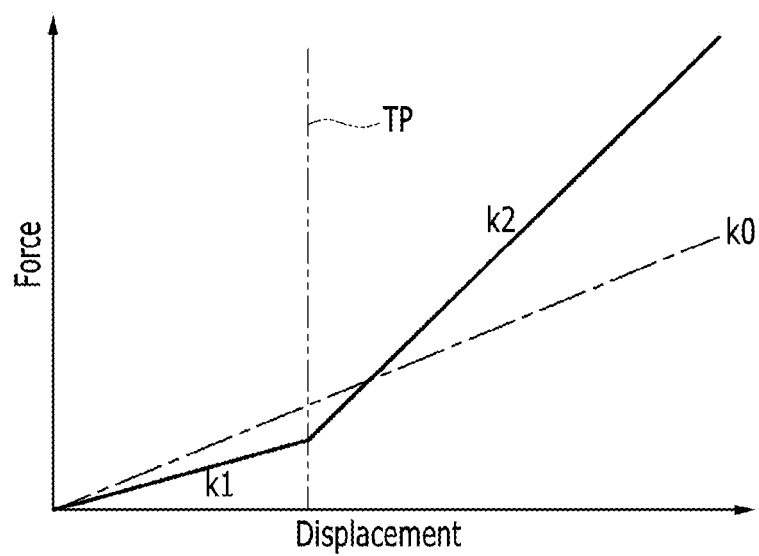
FIG. 14 is a graph showing an example operation of the vehicle stabilizer apparatus.

FIG. 14 is a graph explaining the operation of a vehicle stabilizer apparatus.

When the vehicle is driving straight, the roll strength value according to the torsional displacement section of the first stabilizer bar 10, second stabilizer bar 20, and torsion bar 50 is defined as 'k1'. In some examples, 'k0' shown in FIG. 14 represents the roll strength value according to the torsional displacement section of a typical stabilizer bar.

The first stabilizer bar 10 and the second stabilizer bar 20 are connected to the torsion bar 50 through the inner case 30 and the outer case 40, and k1 can be set to a value smaller than k0. Accordingly, road noise caused by the vehicle driving straight ahead can be reduced.

In some examples, when the vehicle is turning, the same action as described above occurs. In this case, when additional relative rotation of the inner case 30 and the outer case 40 occurs, the bolt rod 75 of the cam bolt 71 comes into contact with the stepped portion 61 of one of the stoppers 60.

Accordingly, even if the first stabilizer bar 10 and the second stabilizer bar 20 are twisted, the inner case 30 and the outer case 40 do not undergo relative rotation. Therefore, the first stabilizer bar 10 and the second stabilizer bar 20 generate roll strength through additional torsion.

In some examples, the roll strength value according to the additional torsional displacement section of the first stabilizer bar 10 and the second stabilizer bar 20 during the vehicle's turning operation is referred to as 'k2', as shown in FIG. 14. The k2 can be set to a roll strength value greater than k0 and k1.

Therefore, since this case has k2 larger than k0 and k1, it can suppress the roll motion of the vehicle body when the vehicle turns, induce stable driving, and provide ride comfort to the passengers.

In some implementations, as shown in FIG. 14, the spring force transition point from k1 to k2 can be defined as the inflection point (TP). That is, the inflection point (TP) can be defined as the position where the bolt rod 75 of the cam bolt 71 contacts the stepped portion 61 of one of the stoppers 60.

The inflection point as described above can be determined by the gap G1 and G2 between the bolt rod 75 and the stoppers 60. Therefore, the inflection point (TP) can be changed by controlling gap G1 and G2.

In some examples, the fastening nut 81 is first separated from the free end of the bolt rod 75. The cam flange 77 is rotated in one or the other direction together with the bolt rod 75. The amount of rotation (or rotation angle) of the cam flange 77 can be checked by the graduation 79. Then, since the bolt rod 75 is eccentrically connected to the cam flange 77, the bolt rod 75 moves along the guide slot 49. Accordingly, the gaps G1 and G2 between the bolt rod 75 and the stoppers 60 can be adjusted to increase or decrease depending on the amount of rotation of the cam flange 77.

After adjusting the sizes of gap G1 and G2 as described above, fastening nut 81 is engaged to the free end of bolt rod 75.

Therefore, by adjusting the gap G1 and G2 between the bolt rod 75 and the stoppers 60, the inflection point (TP) of the roll strength can be adjusted (or tuned) according to the driving condition of the vehicle.

According to the vehicle stabilizer apparatus 100 described so far, it can be possible to implement dual roll strength according to the driving condition of the vehicle.

Accordingly, the vehicle stabilizer apparatus 100 can effectively control the roll behavior of the vehicle by changing the roll strength value with a simple configuration according to the driving condition of the vehicle.

Furthermore, the vehicle stabilizer apparatus 100 can drastically reduce the number of parts compared to the ARC or ARS.

Accordingly, manufacturing costs such as material costs can be reduced, and thus the vehicle stabilizer apparatus 100 can be applied to various vehicle types at low cost.

Furthermore, the vehicle stabilizer apparatus 100 can easily adjust the inflection point (TP) of the roll strength with a simple configuration, so that the roll behavior of the vehicle can be controlled according to the driving tendency of the driver.

Although the some implementations of the present disclosure have been described above, the present disclosure is not limited thereto, and various modifications can be made within the scope of the claims, the detailed description of the disclosure, and the attached drawings, which also fall within the scope of the present disclosure.

What is claimed is:

1. A stabilizer apparatus for a vehicle, comprising:
a first stabilizer bar connected to a first side suspension arm of the vehicle;
a second stabilizer bar connected to a second side suspension arm of the vehicle;
an inner case connected to the first stabilizer bar;
an outer case that accommodates the inner case therein and is connected to the second stabilizer bar, the outer case being rotatably connected to the inner case;
a torsion bar having (i) a first end connected to the inner case and (ii) a second end connected to the outer case;
a plurality of stoppers disposed at the inner case and arranged at a predetermined interval; and
a stopping member disposed at the outer case, the stopping member being disposed between the plurality of stoppers,
wherein the outer case has (i) an outer open end disposed at a first side of the outer case, (ii) an outer closed end disposed at a second side of the outer case, and (iii) a cover connected to the outer open end, and
wherein the stopping member comprises:
a cam bolt movably mounted to the outer closed end and the cover, and
a fastening nut engaged with the cam bolt and configured to fix the cam bolt to the outer closed end and the cover.

2. The stabilizer apparatus of claim 1, wherein the stopping member is disposed at an inside of the outer case and disposed at a predetermined distance from the plurality of stoppers.

3. The stabilizer apparatus of claim 2, wherein the stopping member is configured to be in contact with one of the plurality of stoppers based on twist directions of the first stabilizer bar and the second stabilizer bar.

4. The stabilizer apparatus of claim 1, wherein the inner case comprises a body having a cylinder shape, the body having a circular arc groove that is defined at a portion of an exterior circumference surface of the body along a circumferential direction of the body.

5. The stabilizer apparatus of claim 4, wherein the plurality of stoppers comprise a stepped portion defined at each side of the circular arc groove.

6. The stabilizer apparatus of claim 5, wherein the stopping member is disposed in an inner region of the circular arc groove and spaced apart from the stepped portion by a predetermined distance.

7. The stabilizer apparatus of claim 1, wherein the inner case has (i) an inner closed end disposed at a first side of the inner case and (ii) an inner open end disposed at a second side of the inner case.

8. The stabilizer apparatus of claim 7, wherein the inner case comprises (i) a first protruding portion disposed at the inner closed end and (ii) a second protruding portion formed at the inner open end, and
wherein the outer case comprises a third protruding portion disposed at the outer closed end.

9. The stabilizer apparatus of claim 8, wherein the first stabilizer bar passes through the cover and is connected to the first protruding portion, and
wherein the second stabilizer bar is connected to the third protruding portion.

10. The stabilizer apparatus of claim 8, further comprising:
a first bearing that connects the cover of the outer case to the first protruding portion; and
a second bearing that connects the outer closed end of the outer case to the second protruding portion.

11. The stabilizer apparatus of claim 7, wherein the torsion bar is connected to the inner closed end and disposed at an inside of the inner case, the torsion bar being connected to the outer closed end through the inner open end.

12. The stabilizer apparatus of claim 7, wherein the torsion bar comprises (i) a first connecting protrusion disposed at the first end of the torsion bar and (ii) a second connecting protrusion disposed at the second end of the torsion bar, each of the first and second connecting protrusions having a polygonal shape,
wherein the inner case defines a first connecting pit at an inner surface of the inner closed end, the first connecting pit receiving the first connecting protrusion, and
wherein the outer case defines a second connecting pit at an inner surface of the outer closed end, the second connecting pit receiving the second connecting protrusion.

13. The stabilizer apparatus of claim 1, wherein the stopping member is movably disposed at the outer case and configured to adjust a gap between the stopping member and one of the plurality of stoppers.

14. The stabilizer apparatus of claim 1, wherein the outer case defines a guide slot that extends through the outer closed end and the cover, and
wherein the cam bolt comprises:
a bolt head;
a bolt rod connected to the bolt head and fitted into the guide slot; and
a cam flange eccentrically connected to a side of the bolt rod.

15. The stabilizer apparatus of claim 14, wherein the fastening nut is engaged with a free end of the bolt rod and supports the outer closed end and the cover through the cam flange.

16. The stabilizer apparatus of claim 14, wherein the outer case further defines a cam follower groove at an outer surface of the outer closed end and an outer surface of the cover, and
wherein the cam flange is rotatably connected to the cam follower groove.

17. The stabilizer apparatus of claim 14, wherein the cam flange has a graduation.

18. The stabilizer apparatus of claim 17, wherein the graduation of the cam flange is configured to align the cam bolt with a position of the outer case.

19. A stabilizer apparatus for a vehicle, comprising:
a first stabilizer bar connected to a first side suspension arm of the vehicle;
a second stabilizer bar connected to a second side suspension arm of the vehicle;
an inner case connected to the first stabilizer bar;
an outer case that accommodates the inner case therein and is connected to the second stabilizer bar, the outer case being rotatably connected to the inner case;
a torsion bar having (i) a first end connected to the inner case and (ii) a second end connected to the outer case;
a plurality of stoppers disposed at the inner case and arranged at a predetermined interval; and a stopping member disposed at the outer case, the stopping member being disposed between the plurality of stoppers, wherein the outer case has (i) an outer open end disposed at a first side of the outer case, ii) an outer closed end disposed at a second side of the outer case, and (iii) a cover connected to the outer open end, and wherein the stopping member comprises:
  first and second cam bolts, each of the first and second cam bolts being movably mounted to the outer closed end and the cover, and
  first and second fastening nuts that are engaged with the first and second cam bolts, respectively, and configured to fix the first and second cam bolts to the outer closed end and the cover.

\* \* \* \* \*